L. ARMBRUSTER.
MOLE TRAP.
APPLICATION FILED AUG. 10, 1916.
1,216,918.
Patented Feb. 20, 1917.
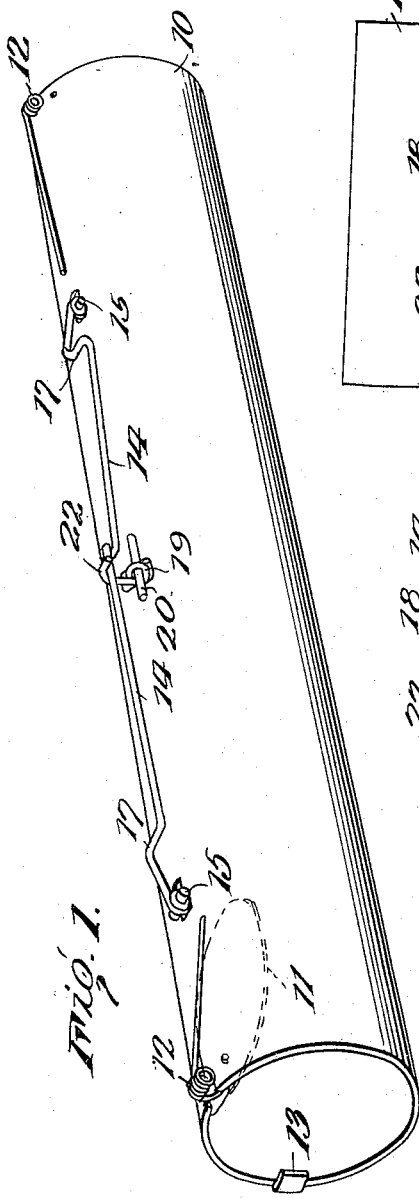
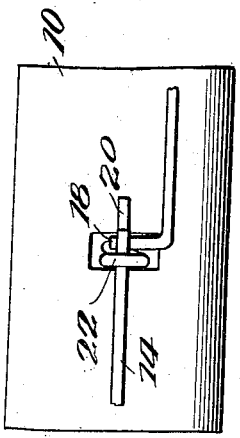
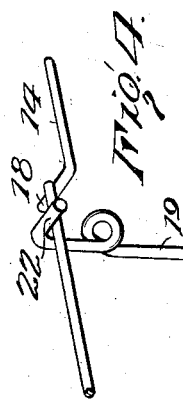
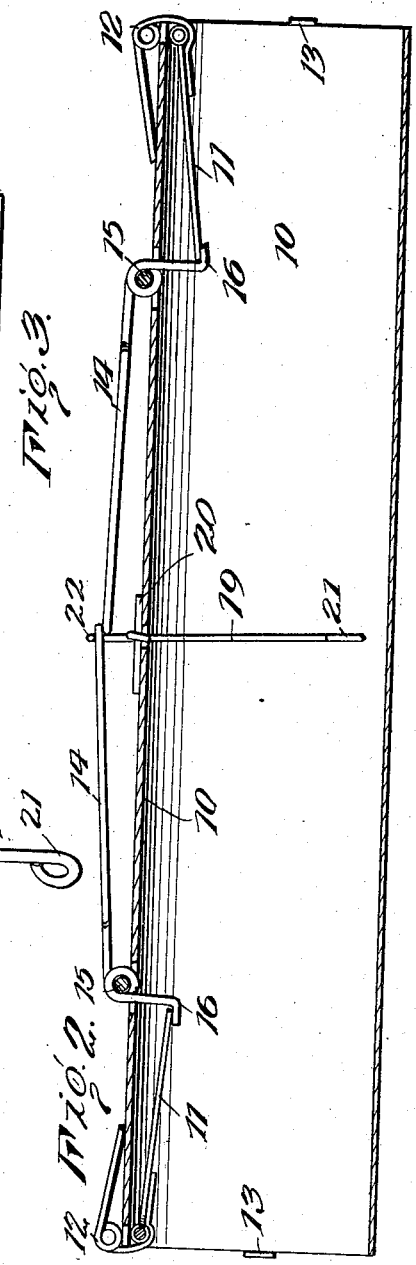
Inventor
L. Armbruster
By
Attorneys

MOLE-TRAP.

UNITED STATES PATENT OFFICE.

LOUIS ARMBRUSTER, OF EAST AUBURN, CALIFORNIA.

1,216,918.   Specification of Letters Patent.   Patented Feb. 20, 1917.

Application filed August 10, 1916. Serial No. 114,259.

*To all whom it may concern:*

Be it known that I, LOUIS ARMBRUSTER, a citizen of the United States, residing at East Auburn, in the county of Placer and State of California, have invented certain new and useful Improvements in Mole-Traps, of which the following is a specification.

This invention relates to an improved trap more particularly designed for catching moles or other similar burrowing animals and has as its primary object to provide a device of this character which may be positioned in the runway of the mole to be set off by the mole when within the trap.

The invention has as a further object to provide a trap of such construction that the mole will not likely be frightened by the presence of the trap within the runway and wherein the mole may have an unobstructed view through the trap.

The invention has as a further object to provide a trap having doors at opposite ends thereof so that the mole may enter the trap from either end and wherein the said doors will be mounted to swing outwardly to closed position and will thus be adapted to expel any dirt within the ends of the trap so that the said doors will not likely become wedged or stuck to allow the escape of the mole.

Other and incidental objects will appear as the description proceeds and in the drawings wherein I have illustrated the preferred embodiment of the invention and wherein similar reference characters designate corresponding parts throughout the several views:

Figure 1 is a perspective view of the trap showing the trap set,

Fig. 2 is a longitudinal sectional view more particularly showing the mounting of the doors of the trap as well as the mounting of the trip levers for the said doors and the trigger arranged for engagement with the said levers to hold the doors open, Fig. 3 is a fragmentary plan view particularly showing the mounting of the trigger, and Fig. 4 is a detail perspective view showing the engagement between the trigger and the trip levers as well as the engagement between the inner ends of the said levers for holding the doors open.

In carrying out the invention, the trap is formed preferably with a cylindrical body 10 of approved length and diameter. The body 10 may be constructed of sheet metal or other suitable material and is open at its ends. Hingedly mounted within the ends of the body 10, are doors 11. These doors are also preferably constructed of sheet metal and are normally held in closed position by springs 12, the body 10 being provided, at its ends, with stop lugs 13 for limiting the doors in their outward movement under the influence of the said springs.

Mounted upon the upper side of the body 10 adjacent the ends thereof, are trip levers 14. The levers 14 are preferably each formed from a length of suitable resilient wire and are bent to embrace pintles 15 with the inner extremities of the levers projecting through slots in the upper side of the body 10 and terminally provided with hooks 16. The levers 14, adjacent the pintles 15, are offset as at 17 and then extend toward the longitudinal center of the body 10 to meet at a point substantially midway the ends of the said body. One of the arms 14 is, at its inner extremity, provided with a terminal laterally directed lug or arm 18.

Depending into the body 10, at a point substantially midway its ends, is a trigger 19. This trigger is preferably formed of a length of suitable resilient wire bent adjacent the outer extremity thereof to freely embrace a suitable pivot rod 20 upon the upper side of the body 10 for pivotally supporting the said trigger. At its inner end, the trigger 19 is formed with a head 21 while the trigger, at its outer end, is provided with a hook 22. To set the trap, the doors 11 are swung inwardly within the body 10 and the hooks 16 of the trip levers 14 engaged with the free ends of the said doors. The outer ends of the trip levers are then moved toward the trigger 19 and the hook 22 of the said trigger engaged over one of the said levers with the other lever engaging said first mentioned lever, as particularly illustrated in Fig. 4 of the drawings by its terminal lug 18. When thus set, the trap may be placed in the runway of a mole. However, before thus placing the trap, the body thereof is preferably dampened and fine dirt poured over the trap which will then stick to the trap body so that when the trap is disposed in the runway of the mole, it will have the same general appearance as the walls of the runway. The mole, in approaching the trap from either direction will, as will be obvious, have an unobstructed view through the trap so that the presence of the trap within the runway will not be likely to frighten the mole.

The trigger 19 is arranged to extend into the body 10 of the trap substantially diametrically thereof so that a mole upon entering the trap will encounter the head 21 of the trigger. Upon the release of the trigger by the mole, the inner extremities of the trip levers 14 will be freed so that the said levers may then swing to free the doors 11 which will be immediately closed by the springs 12 to trap the mole. In this connection, attention is directed to the fact that the doors 11 are mounted to swing outwardly toward the open ends of the trap so that the presence of any dirt within the extremities of the body 10 will not be likely to cause the doors 11 to wedge or stick when closing and consequently permit the escape of the mole. It is further to be observed that the trigger 19 is mounted at a point out of alinement with the mounting for the trip levers 14, the said trip levers being offset for this reason to extend toward the said trigger. Owing to this disposition of the trigger, the possibility of either of the levers 14 catching on the trigger hook so that only one of the said levers would be released upon the actuation of the trigger, is overcome, and the effective operation of the trap assured upon the actuation of the trigger.

Having thus described the invention, what is claimed as new is:

1. A device of the character described including a body open at its ends, stop lugs projecting into the open ends of the body, doors mounted to swing into the body and normally urged to engage said stop lugs for closing the body, a pivotally mounted trigger arranged intermediate the ends of the body, and trip levers pivotally mounted upon the body with their outer extremities projecting into the body and provided with hooks for engagement with the free ends of said doors and with the inner extremities of the said levers projecting toward said trigger to coöperate therewith for holding the doors open.

2. A trap including a body, doors normally arranged to close the body, trip levers engaged at their outer ends with the free extremities of the doors with the inner extremity of one of said levers engaged with the inner extremity of the other, and a trigger coöperating with the inner extremity of one of the levers for retaining both of the levers to hold the doors open.

3. A trap of the character described including a body, inwardly swinging doors normally arranged to close the open ends of the body, trip levers projecting into the body in the rear of said doors for engagement with the free extremities thereof, and a trigger mounted between the doors for engagement with the inner extremities of said levers to hold the doors open.

4. A trap including a body, inwardly swinging doors normally arranged to close the body, trip levers mounted for engagement with the free extremities of the doors, and a trigger mounted in transversely offset relation with respect to the mounting of the said levers with one of the levers engaged with the trigger and with the other of the levers engaged with said first mentioned levers for holding the doors open.

5. A trap including a body, inwardly swinging doors normally arranged to close the body, trip levers mounted for engagement with the free extremities of said doors, a trigger mounted in transversely offset relation to said trip levers with the inner extremities of the said levers offset to extend toward the trigger and with one of the said levers engaged with the trigger, and a laterally directed lug carried by the inner extremity of the other of said levers and engaged with said first mentioned lever with the trigger acting upon the levers to hold the doors open.

6. A device of the character described including a tubular trap body, inwardly swinging doors arranged to normally close the said body, trip levers pivotally mounted upon the body at one side thereof with the outer extremities of said levers projecting into the body for engagement with the free ends of said doors, and a trigger pivotally mounted upon the body between the said levers and coacting therewith for holding the doors open.

In testimony whereof I affix my signature.

LOUIS ARMBRUSTER. [L. S.]

Copies of this patent may be obtained for five cents each, by addressing the "Commissioner of Patents, Washington, D. C."